US011880700B2

(12) United States Patent
Lee et al.

(10) Patent No.: US 11,880,700 B2
(45) Date of Patent: Jan. 23, 2024

(54) ELECTRONIC DEVICE AND OPERATING METHOD THEREOF

(71) Applicant: Samsung Electronics Co., Ltd., Gyeonggi-do (KR)

(72) Inventors: Kyungseok Lee, Gyeonggi-do (KR); Jingu Kang, Gyeonggi-do (KR); Kihun Heo, Gyeonggi-do (KR); Hyojong Kim, Gyeonggi-do (KR); Hakryoul Kim, Gyeonggi-do (KR); Hyunjoon Kim, Gyeonggi-do (KR); Donggyu Ahn, Gyeonggi-do (KR); Haewook Lee, Gyeonggi-do (KR); Kwanhee Jeong, Gyeonggi-do (KR); Mooyoung Kim, Gyeonggi-do (KR); Minjung Kim, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 532 days.

(21) Appl. No.: 17/263,591

(22) PCT Filed: Apr. 25, 2019

(86) PCT No.: PCT/KR2019/004987
§ 371 (c)(1),
(2) Date: Jan. 27, 2021

(87) PCT Pub. No.: WO2020/022616
PCT Pub. Date: Jan. 30, 2020

(65) Prior Publication Data
US 2021/0303320 A1    Sep. 30, 2021

(30) Foreign Application Priority Data

Jul. 27, 2018    (KR) .......................... 10-2018-0087951

(51) Int. Cl.
*G06F 9/455* (2018.01)

(52) U.S. Cl.
CPC ...... *G06F 9/45504* (2013.01); *G06F 9/45558* (2013.01); *G06F 2009/45562* (2013.01);
(Continued)

(58) Field of Classification Search
CPC .................................................. G06F 9/45504
See application file for complete search history.

(56) References Cited

U.S. PATENT DOCUMENTS 8,539,454 B2    9/2013    Havin
10,108,475 B2 *    10/2018    Chikabelapur ....... G06F 11/079
(Continued)

FOREIGN PATENT DOCUMENTS

JP    2003-173323 A    6/2003
JP    4989935 B2    8/2012
(Continued)

OTHER PUBLICATIONS

"Java Reference & GC"; Apr. 2, 2013; 8 Pages; http://d2.naver.com/helloworld/329.
(Continued)

*Primary Examiner* — Charlie Sun
(74) *Attorney, Agent, or Firm* — Cha & Reiter, LLC

(57) ABSTRACT

Various embodiments of the present invention relate to a method for managing a memory in a Java execution environment, and an electronic device for performing same, and an electronic device may comprise a processor and a memory electrically connected to the processor, wherein: the memory is configured to store multiple Java application programs, and stores instructions that, when executed, cause the processor to execute a virtual machine configured to execute at least one Java application stored in the memory; and when generation of an object is detected during execution of the Java application, the virtual machine executed by the processor generates a reference for the generated object,
(Continued)

identifies an application, which has generated the object by a threshold or more, on the basis of the generated reference, and provides information on the identified application to the processor. Other embodiments may also be possible.

15 Claims, 12 Drawing Sheets

(52) U.S. Cl.
CPC .............. *G06F 2009/45583* (2013.01); *G06F 2009/45591* (2013.01)

(56) References Cited

U.S. PATENT DOCUMENTS

| | | | |
|---|---|---|---|
| 11,269,748 B2* | 3/2022 | Chen | .................. G06F 12/0253 |
| 2005/0204342 A1 | 9/2005 | Broussard | |
| 2008/0243970 A1 | 10/2008 | Schmelter et al. | |
| 2008/0294936 A1 | 11/2008 | Hogstrom et al. | |
| 2011/0029822 A1 | 2/2011 | Moser | |
| 2011/0138367 A1 | 6/2011 | Havin | |
| 2012/0216076 A1 | 8/2012 | Macik et al. | |

FOREIGN PATENT DOCUMENTS

| | | |
|---|---|---|
| KR | 2002-0025519 A | 4/2002 |
| KR | 10-2007-0083262 A | 8/2007 |
| KR | 10-2019-0101653 A | 9/2019 |

OTHER PUBLICATIONS

European Search Report dated Feb. 1, 2022.
European Search Report dated Jul. 26, 2021.
Korean Office Action dated Jul. 20, 2023.

* cited by examiner

| INDEX | OWNER |
|-------|-------|
| 0001  | AAA   |

710

· · ·

| INDEX | OWNER |
|-------|-------|
| 0001  | AAA   |
| 0002  | BBB   |
| 0003  | AAA   |
| ⋮     | ⋮     |
| 9999  | AAA   |
| 10000 | CCC   |

ELECTRONIC DEVICE AND OPERATING METHOD THEREOF

CROSS REFERENCE TO RELATED APPLICATIONS

This application is a National Phase Entry of PCT International Application No. PCT/KR2019/004987, which was filed on Apr. 25, 2019, and claims a priority to Korean Patent Application No. 10-2018-0087951, which was filed on Jul. 27, 2018, the contents of which are incorporated herein by reference.

TECHNICAL FIELD

Various embodiments of the present disclosure relate to a method for managing a memory in a Java execution environment, and an electronic device for performing the same.

BACKGROUND ART

With the growth of information and communication technology and semiconductor technology, various electronic devices are developing into multimedia devices offering various multimedia services. For example, the multimedia service can include at least one of a voice call service, a message service, a broadcasting service, a wireless Internet service, a camera service, a video play service and a music play service.

For this, the electronic device has various applications corresponding to multimedia service functions. The application can be executed by a virtual machine (for example, a Java virtual machine, a Dalvik virtual machine, etc.) which is driven on an operating system of the electronic device. This virtual machine can offer a garbage collection function of releasing a block which is no longer used among allocated heap memory blocks.

DISCLOSURE OF INVENTION

Technical Problem

Generally, garbage collection is performed on the basis of reference information (for example, a root set of a thread) on objects stored in a heap. For example, a reachable object referred to in the root set of the thread is excluded from a garbage collection target, and an unreachable object not referred to in the root set can be designated as the garbage collection target.

This reference information can be stored in the form of a table and thus be denoted as a reference table. When the reference information is continually accumulated, an overflow of the reference table occurs, and this can result in a problem that a system (for example, a system server) is resumed.

Various embodiments of the present disclosure can offer an apparatus and method for preventing an overflow of a reference table, in an electronic device.

Various embodiments of the present disclosure can offer an apparatus and method for monitoring a reference table to identify an application which provides an abnormal object, in an electronic device.

Various embodiments of the present disclosure can offer an apparatus and method for terminating an operation of an application which provides an abnormal object, in an electronic device.

Solution to Problem

An electronic device of various embodiments of the present disclosure can include a processor, and a memory electrically connected to the processor. The memory can be configured to store multiple Java application programs, and can store instructions that, when executed, cause the processor to execute a virtual machine configured to execute at least one Java application stored in the memory. In response to provision of an object being detected during execution of the Java application, the virtual machine executed by the processor can provide a reference for the provided object, and identify an application, which has provided the object by a threshold or more, on the basis of the provided reference, and offer information on the identified application to the processor.

An operating method of an electronic device of various embodiments of the present disclosure can include executing a Java application through a virtual machine, and in response to provision of an object being detected during execution of the Java application, providing a reference for the provided object, and identifying an application, which has provided the object by a threshold or more, on the basis of the provided reference, and offering information on the identified application.

Advantageous Effects of Invention

According to various embodiments, an operation of an electronic device and an apparatus can prevent the occurrence of an overflow of a reference table, by monitoring the reference table and inducing the end of an operation of an application which provides an abnormal object or the deletion of the application.

BRIEF DESCRIPTION OF DRAWINGS

FIG. 7 is a diagram for explaining an operation of providing object possession information according to various embodiments.

BEST MODE FOR CARRYING OUT THE INVENTION

Various embodiments of the present disclosure are described below in detail with reference to the accompanying drawings. And, in describing an embodiment of the present disclosure, a detailed description of related well-known functions or constructions is omitted when it is judged that the detailed description would obscure the gist of the present disclosure unnecessarily. And, the terms described below, terms defined considering functions in the present disclosure, can be differentiated in accordance to user and/or operator's intention or practice, etc. Therefore, the definition should be given on the basis of the content throughout the present specification.

Figure 1:
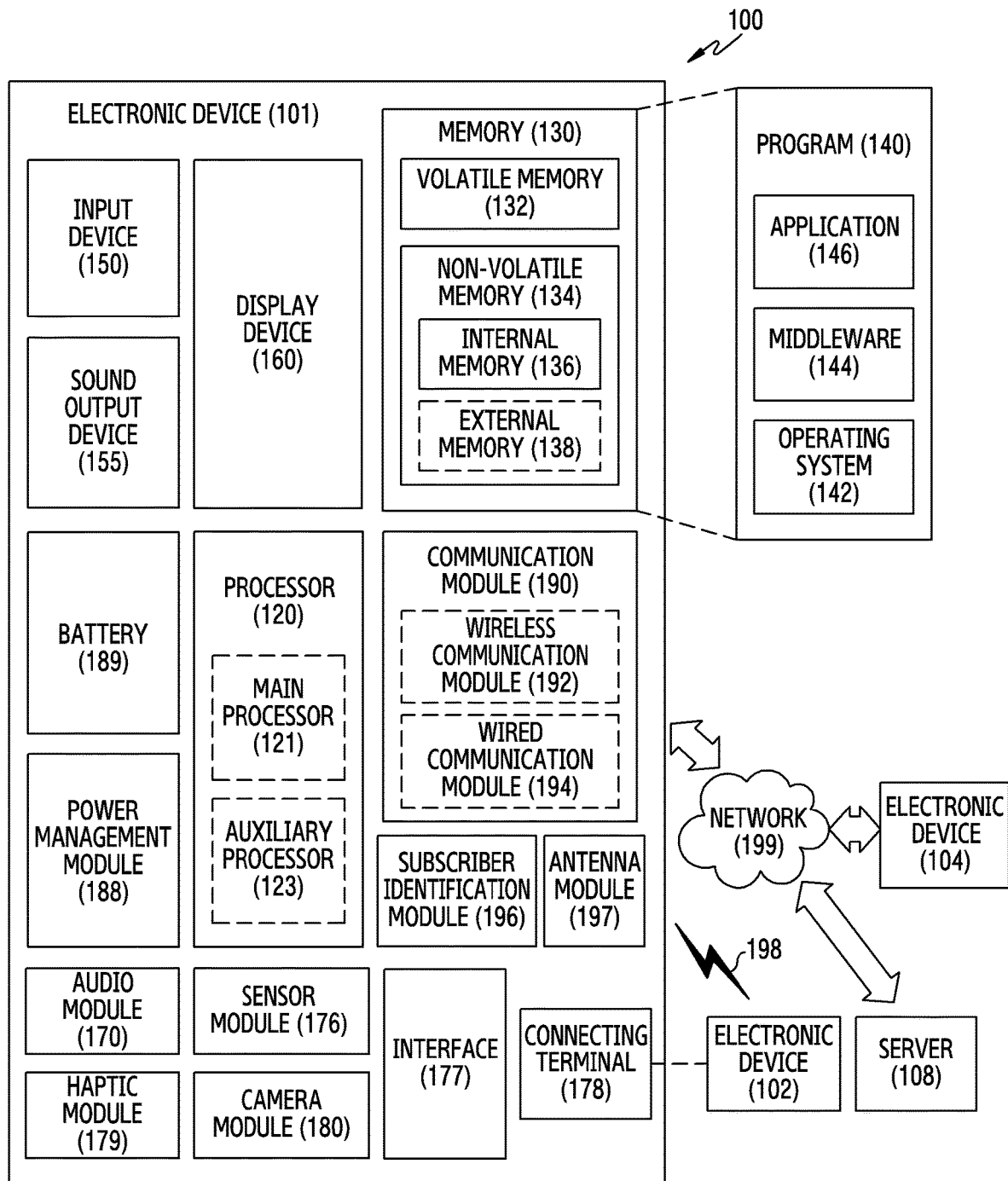
FIG. 1 is a block diagram of an electronic device within a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include a plurality of antennas, and at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
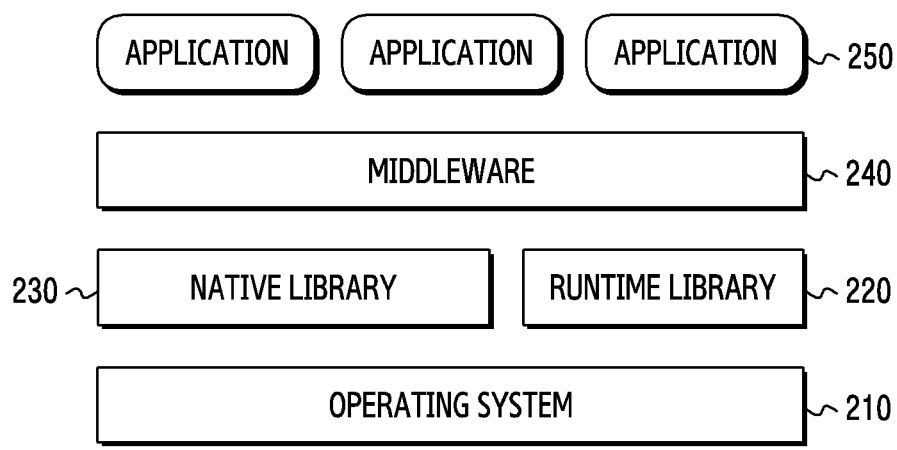
FIG. 2 is a block diagram exemplifying a program according to various embodiments.

FIG. 2 is a block diagram exemplifying the program 140 according to various embodiments. According to an embodiment, the program 140 can include an operating system 210 to control one or more resources of the electronic device 101, a runtime library 220, a native library 230, middleware 240, or applications 250 executable in the operating system 210. The operating system 200 can include, for example, Android™, iOS™, Windows™, Symbian™, Tizen™, or Bada™. At least part of the program 200, for example, can be pre-loaded on the electronic device 101 during manufacture, or can be downloaded from or refined by an external electronic device (e.g., the electronic device 102 or 104, or the server 108) during use by a user.

The operating system 201 can control management (e.g., allocation or deallocation) of one or more system resources (e.g., the processor 120, the memory 130, or a power source (e.g., the power management module 188)) of the electronic device 101. Additionally or alternatively, the operating system 200 can include one or more driver programs to drive other hardware devices of the electronic device 101, for example, the input apparatus 150, the sound output apparatus 155, the display apparatus 160, the audio module 170, the sensor module 176, the interface 177, the haptic module 179, the camera module 180, the power management module 188, the battery 189, the communication module 190, the subscriber identification module 196, or the antenna module 197.

The runtime library 220 can offer a minimal environment for executing at least one application 250. For example, the runtime library 220 can be mounted on the operating system 210, and interpret a code developed with Java, adaptively to the operating system 210. According to an embodiment, as described later through FIG. 3A, the runtime library 220 can execute an application (e.g., a Java application) by invoking a function (e.g., a native function) stored in the native library 230 or using a function (e.g., a Java function) stored in the runtime library 220 (e.g., a core library). For example, the runtime library 220 can include at least one of a JAVA virtual machine, a Dalvik virtual machine, and/or an Android runtime.

The native library 230, an upper layer for the operating system 210, can include a library implemented with C or C+. For example, such library as libc, Webkit, SQLite database, etc. can be stored in the native library 230.

The middleware 240 can provide various functions to the application 250 wherein the application 250 can use a function or information offered from one or more resources of the electronic device 101. The middleware 240, for example, though not illustrating, can include an application manager, a window manager, a multimedia manager, a resource manager a power manager, a database manager, a package manager, a connectivity manager, a notification manager, a location manager, a graphic manager, a security manager, a telephony manager, or a voice recognition manager.

The application manager, for example, can manage a lifecycle of an application. The window manager, for example, can manage one or more GUI resources that are used on a screen. The multimedia manager, for example, can identify one or more formats necessary for playing media files, and can encode or decode a corresponding one of the media files using a codec appropriate for a corresponding format selected from the one or more formats. The resource manager, for example, can manage a source code of an application or a space of a memory. The power manager, for example, can manage the capacity, temperature, or power of the battery, and determine or offer related information necessary for the operation of the electronic device 101 by using corresponding information on the capacity, temperature, or power of the battery. According to an embodiment, the power manager can interwork with a basic input/output system (BIOS) (not shown) of the electronic device 101.

The database manager, for example, can provide, search, or change a database to be used by the application 250. The package manager, for example, can manage installation or refining of an application that is distributed in the form of a package file. The connectivity manager, for example, can manage a wireless connection or a direct connection between the electronic device 101 and the external electronic device. The notification manager, for example, can offer a function to notify a user of the occurrence of a specified event (e.g., an incoming call, message, or alert). The location manager, for example, can manage locational information on the electronic device 101. The graphic manager, for example, can manage one or more graphic effects to be offered to a user or a user interface related to the one or more graphic effects.

The security manager, for example, can offer system security or user authentication. The telephony manager, for example, can manage a voice call function or a video call function offered by the electronic device 101. The voice recognition manager, for example, can transmit a user's voice data to the server 108, and receive, from the server 108, a command corresponding to a function to be executed on the electronic device 101 based at least in part on the voice data, or text data converted based at least in part on the voice data. According to an embodiment, the middleware 240 can dynamically delete some existing components or add new components. According to an embodiment, at least part of the middleware 240 can be included as part of the operating system 200 or can be implemented as another software separate from the operating system 200.

The application 250, for example, though not illustrating, can include a home, dialer, SMS/MMS, instant message (IM), browser, camera, alert, contact, voice recognition, e-mail, calendar, media player, album, watch, health care (e.g., measuring biometric information such as momentum, blood sugar or the like), or environment information (e.g., air pressure, humidity or temperature information measurement) application. According to an embodiment, the application 250 can further include an information exchange application capable of supporting information exchange between the electronic device 101 and the external electronic device. The information exchange application, for example, can include a notification relay application adapted to transfer specified information (e.g., a call, message, or alert) to the external electronic device, or a device management application adapted to manage the external electronic device. The notification relay application can transfer notification information corresponding to the occurrence of a specified event (e.g., receipt of an email) in another application (e.g., an email application) of the electronic device 101 to the external electronic device. Additionally or alternatively, the notification relay application can receive notification information from the external electronic device and offer the same to a user of the electronic device 101.

The device management application, for example, can control the power (e.g., turn-on or turn-off) or the function (e.g., a brightness, resolution, or focus of the display apparatus 160 or the camera module 180) of the external electronic device or some components (e.g., the display apparatus 160 or the camera module 180) thereof communicating with the electronic device 101. The device management application, additionally or alternatively, can support installation, deletion, or refining of an application running on the external electronic device.

Figure 3A:
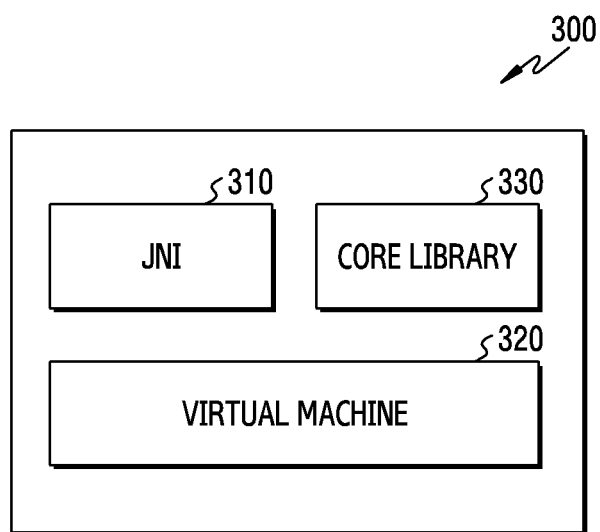
FIG. 3A is a block diagram exemplifying a runtime library according to various embodiments.
Figure 3B:
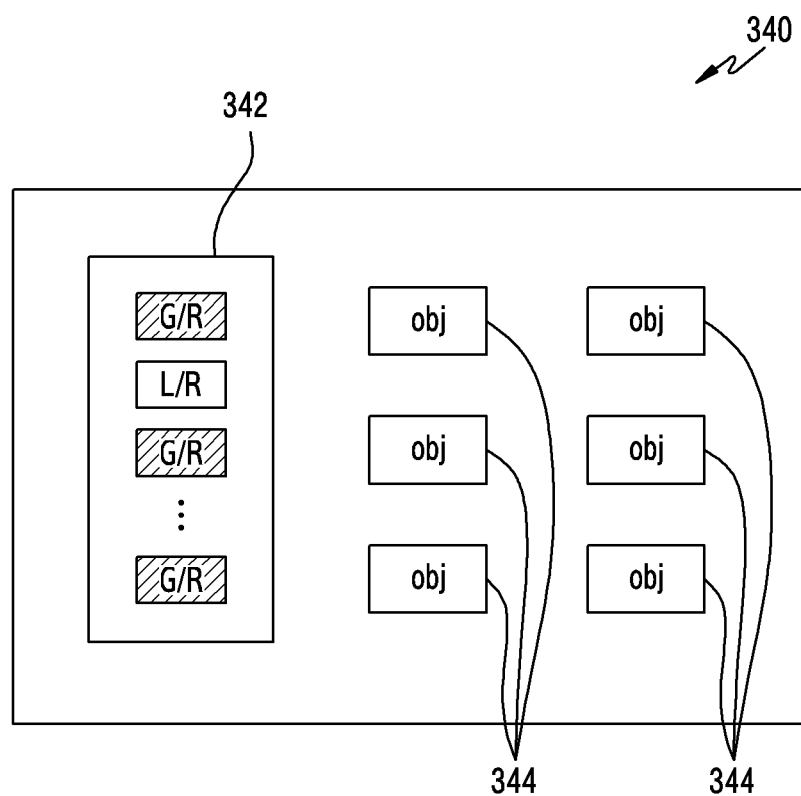
FIG. 3B is a diagram for explaining reference information according to various embodiments.

FIG. 3A is a block diagram 300 illustrating the runtime library 220 according to various embodiments. In the following description, FIG. 3B is a diagram 340 for explaining reference information according to various embodiments.

Referring to FIG. 3A, the runtime library 220 can be a Java runtime which includes a Java native interface (JNI) 310, a virtual machine 320, and/or a core library 330. The core library 330 can include a library implemented with Java. This is merely illustrative, and an embodiment of the present disclosure is not limited to this. For example, the runtime library 220 can omit at least one of the aforementioned constructions or additionally add other constructions except for the aforementioned constructions as well.

According to various embodiments, the virtual machine 320 can execute various Java components which exist within the middleware 240 (e.g., an application framework). According to an embodiment, in response to the application 250 (e.g., the Java application) being executed, the virtual machine 320 can be allocated a memory region needed by the executed application from the operating system 210. The allocated memory region can include a heap region. This is merely illustrative, and an embodiment of the present disclosure is not limited to this. For example, the allocated memory region, a runtime data region, can include a method region, a stack region, a native method region and a PC register as well.

According to various embodiments, in response to detecting the provision of a Java object, the virtual machine 320 can store the provided object in the allocated memory region (for example, a heap region). According to an embodiment, the virtual machine 320 can detect the invoking of a native function through the JNI 310 during the execution of the Java application 250 (e.g., a Java byte code). In response to the invoking of the native function, the virtual machine 320 can provide an object corresponding to a function which has been invoked in the Java application 250 by using the native library 230. The provided object can be offered to the Java application 250 through the JNI 310. Contrary, the virtual machine 320 can provide an object by using the core library 330, and offer the provided object to the native library 230 through the JNI 310.

According to various embodiments, the virtual machine 320 can provide reference information on a provided object. For example, the virtual machine 320 can provide reference information that indicates a thread having provided an object. For another example, in response to a first object stored in the heap region using a variable related to a second object, the virtual machine 320 can provide reference information that indicates that the first object and the second object are mutually reachable objects. The reference information can be stored in the form of a table having a previously specified size. For example, the reference table can include reference information of a specified number (e.g., 51,200).

According to an embodiment, as illustrated in FIG. 3B, reference information 342 can be divided into a local reference (L/R) and a global reference (G/R). This is merely illustrative, and an embodiment of the present disclosure is not limited to this. The local reference (L/R) is reference information related to an object which is usable only in one thread (e.g., a thread having provided an object) among objects 344 stored in the heap region. The global reference (G/R) is reference information related to an object which is usable in many threads among the objects 344 stored in the heap region.

According to various embodiments, on the basis of the provided reference information, the virtual machine 320 can identify an application abnormally providing an object. For example, the virtual machine 320 can identify an application which provides an overflow of a reference table.

According to an embodiment, as described later through FIG. 5 to FIG. 7, in order to identify an application which abnormally provides an object, the virtual machine 320 can provide possession information on the provided object. The possession information can include information on an application related to a thread having provided the object. For example, in response to a reference stored in a reference table exceeding a specified first criterion value (e.g., 40,000), the virtual machine 320 can begin to provide possession information. The possession information can be provided until the number of the references stored in the reference table exceeds a second criterion value (e.g., 50,000).

According to an embodiment, the virtual machine 320 can analyze application information included in the provided possession information, for example, applications having provided 10,000 objects, to identify the application which abnormally provides the object. For example, the virtual machine 320 can identify applications having provided objects, and identify one application having provided the most objects. For another example, the virtual machine 320 can identify applications having provided objects, and identify at least one application having the provided objects of a specified number or more.

According to various embodiments, the virtual machine 320 can notify information on an application which abnormally provides an object. The information on the application can include at least one of application ID, application name, or application version information. For example, the application information can be offered to the operating system 210. The application information offered to the operating system 210 can be used by the electronic device 101. For example, the application information can be outputted through the display apparatus 160 of the electronic device 101. In another example, the application information can be transmitted to an application supply server (e.g., the server 108). In this case, the application server can perform error analysis for a corresponding application.

The electronic device (e.g., the electronic device 101 of FIG. 1) of various embodiments disclosed in the present disclosure can be devices of various forms. The electronic device, for example, can include a portable communication device (e.g., a smart phone), a computer device, a portable multimedia device, a portable medical device, a camera, a wearable device, or a home appliance. The electronic device of an embodiment of the present document is not limited to the aforementioned devices.

It should be appreciated that various embodiments of the present document and the terms used therein are not intended to limit the technological features set forth herein to particular embodiments and include various changes, equivalents, or replacements for a corresponding embodiment. With regard to the description of the drawings, similar reference symbols can be used to refer to similar or related components. A singular form of a noun corresponding to an item can include one item or more, unless the relevant context clearly indicates otherwise. In the present document, each of such phrases as "A or B", "at least one of A and B", "at least one of A or B," "A, B, or C", "at least one of A, B, and C", and "at least one of A, B, or C", can include all possible combinations of the items enumerated together in a corresponding one of the phrases. Such terms as "a first", "a second", or "the first" or "the second" can be used to simply distinguish a corresponding component from another corresponding component, and does not limit the corresponding components in another aspect (e.g., importance or sequence). If any (e.g., a first) element is referred to, with or without the term "operatively" or "communicatively", as "coupled with," "coupled to", "connected with", or "connected to" another (e.g., a second) element, it means that the element can be coupled with the other element directly (e.g., wiredly), wirelessly, or via a third element.

The term "module" used in the present document can include a unit implemented in hardware, software, or firmware, and can interchangeably be used with terms, for example, logic, logic block, part, circuitry or the like. The module can be a single integral part, or a minimum unit of the part or a portion thereof, adapted to perform one or more functions. For example, according to an embodiment, the module can be implemented in the form of an application-specific integrated circuit (ASIC).

Various embodiments of the present document can be implemented as software (e.g., the program 140) which includes one or more instructions stored in a machine (e.g., the electronic device 101)—readable storage medium (e.g., the internal memory 136 or the external memory 138). For example, a processor (e.g., the processor 120) of a machine (e.g., the electronic device 101) can invoke at least one of the one or more instructions stored in the storage medium, and execute it. This allows the machine to be operated to perform at least one function according to the at least one instruction invoked. The one or more instructions can include a code provided by a compiler or a code executable by an interpreter. The machine-readable storage medium can be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method of various embodiments disclosed in the present document can be included in a computer program product and offered. The computer program product can be traded as a product between a seller and a buyer. The computer program product can be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product can be at least temporarily stored, or temporarily provided in the machine-readable storage medium, such as a memory of a manufacturer's server, a server of an application store, or a relay server.

According to various embodiments, each component (e.g., a module or a program) of the above-described components may include a single entity or multiple entities. According to various embodiments, one or more of the above-described components or operations can be omitted, or one or more other components or operations can be added. Alternatively or additionally, multiple components (e.g., modules or programs) can be integrated into a single component. In such a case, the integrated component can still perform one or more functions of each of the multiple components in the same or similar manner as they are performed by a corresponding one of the multiple components before the integration. According to various embodiments, operations performed by the module, the program, or another component can be carried out sequentially, in parallel, repeatedly, or heuristically, or one or more of the operations can be executed in a different sequence or omitted, or one or more other operations can be added.

According to various embodiments, an electronic device (e.g., the electronic device 101) can include a processor (e.g., the processor 120), and a memory (e.g., the memory 130) electrically connected to the processor. The memory can be configured to store multiple Java application programs (e.g., the application 250), and can store instructions that, when executed, cause the processor to execute a virtual machine (e.g., the virtual machine 320) configured to execute at least one Java application stored in the memory. According to an embodiment, in response to provision of an object being detected during execution of the Java application, the virtual machine executed by the processor can provide a reference for the provided object, and identify an application, which has provided the object by a threshold or more, on the basis of the provided reference, and offer information on the identified application to the processor.

According to various embodiments, the virtual machine can monitor the number of global references.

According to various embodiments, in response to the number of the references exceeding a first threshold, the virtual machine can monitor an object which is provided by a designated count, and identify at least one application related to the provided object. According to an embodiment, the virtual machine can monitor an object which is provided until before the number of the references exceeds a second threshold.

According to various embodiments, the virtual machine can store application information related to the provided object. According to an embodiment, the application information can include at least one of application ID, application name, or application version information.

According to various embodiments, the virtual machine can identify at least one reference satisfying a condition among the provided references, and delete the identified at least one reference.

According to various embodiments, the virtual machine can provide an additional region different from a region where the provided reference has been stored, and move the identified at least one reference to the additional region.

According to various embodiments, the instruction can be configured to end the execution of the identified application.

According to various embodiments, the instruction can be configured to delete the identified application.

According to various embodiments, the instruction can be configured to offer the identified application to another electronic device.

Figure 4:
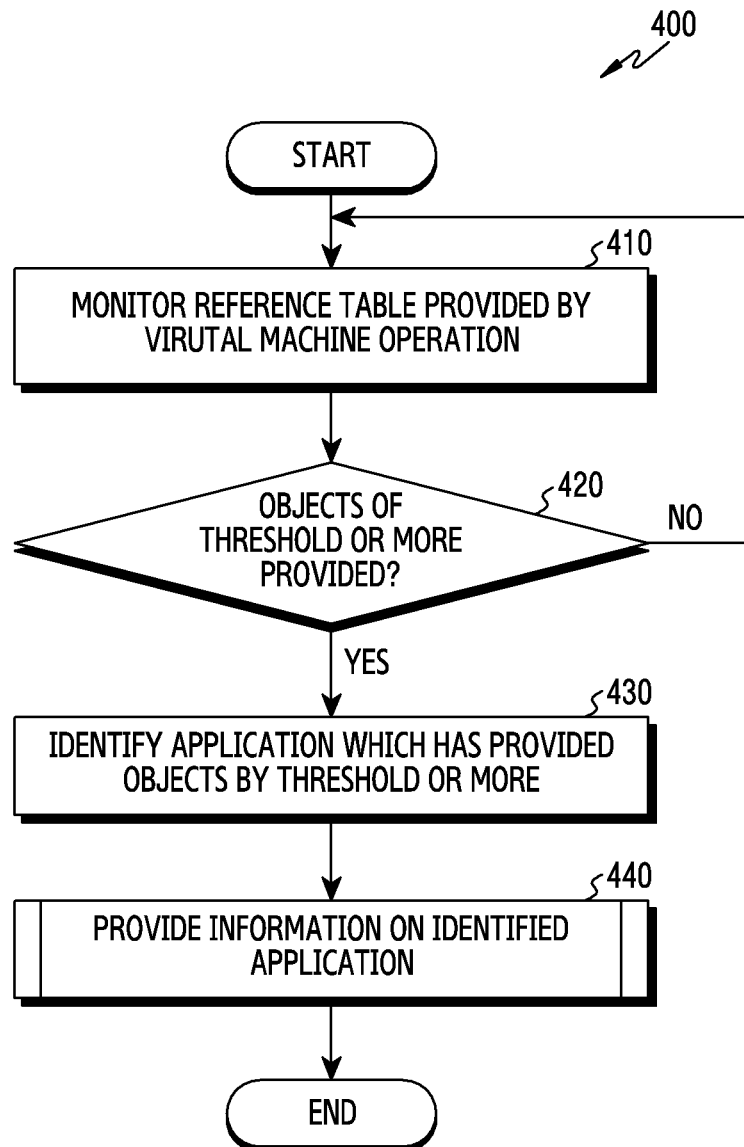
FIG. 4 is a flowchart for managing a memory of a Java environment in an electronic device according to various embodiments.

FIG. 4 is a flowchart 400 for managing a memory of a Java environment in an electronic device according to various embodiments. In an embodiment below, respective operations can be performed in sequence as well, but are not necessarily performed in sequence. For example, the order of the respective operations can be changed as well, and at least two operations can be performed in parallel as well. The electronic device of FIG. 4 can be the electronic device 101 of FIG. 1.

Referring to FIG. 4, in operation 410, the electronic device (e.g., the virtual machine 320 of FIG. 3) of various embodiments can monitor a reference table provided by an operation of the virtual machine 320. The reference table can include a global reference related to an object usable in many threads among objects stored in a heap region of the runtime library 220. According to an embodiment, the virtual machine 320 can perform a monitoring operation correspondingly to the execution of at least one application (e.g., a Java application). However, this is merely illustrative, and the present disclosure is not limited to this. For example, the monitoring operation can be performed during the execution of an application or correspondingly to the end of the execution of the application as well.

In operation 420, the electronic device (e.g., the virtual machine 320) of various embodiments can identify whether objects of a previously specified threshold or more have been provided. The number of objects can be analyzed as the number of references stored in the reference table.

According to various embodiments, in response to objects less than the previously specified threshold being provided, the electronic device (e.g., the virtual machine 320) can monitor the number of the provided objects. The monitoring operation can include at least one of operation 410 and operation 420.

According to various embodiments, in response to objects of the previously specified threshold or more being identified, the electronic device (e.g., the virtual machine 320) can identify an application having abnormally provided the object. For example, the virtual machine 320 can specify an application having provided the object by a threshold or more, as the application having abnormally provided the object.

In operation 440, the electronic device (e.g., the virtual machine 320) of various embodiments can offer information on the application having abnormally provided the object. The virtual machine 320 can offer information on one application which has provided the most objects. For another example, the virtual machine 320 can offer information on one application which has provided an object of a threshold or more. The information on the application can be offered to at least one of the operating system 210 or the processor 120. For example, the information on the application can include at least one of application ID, application name, or application version information.

Figure 5:
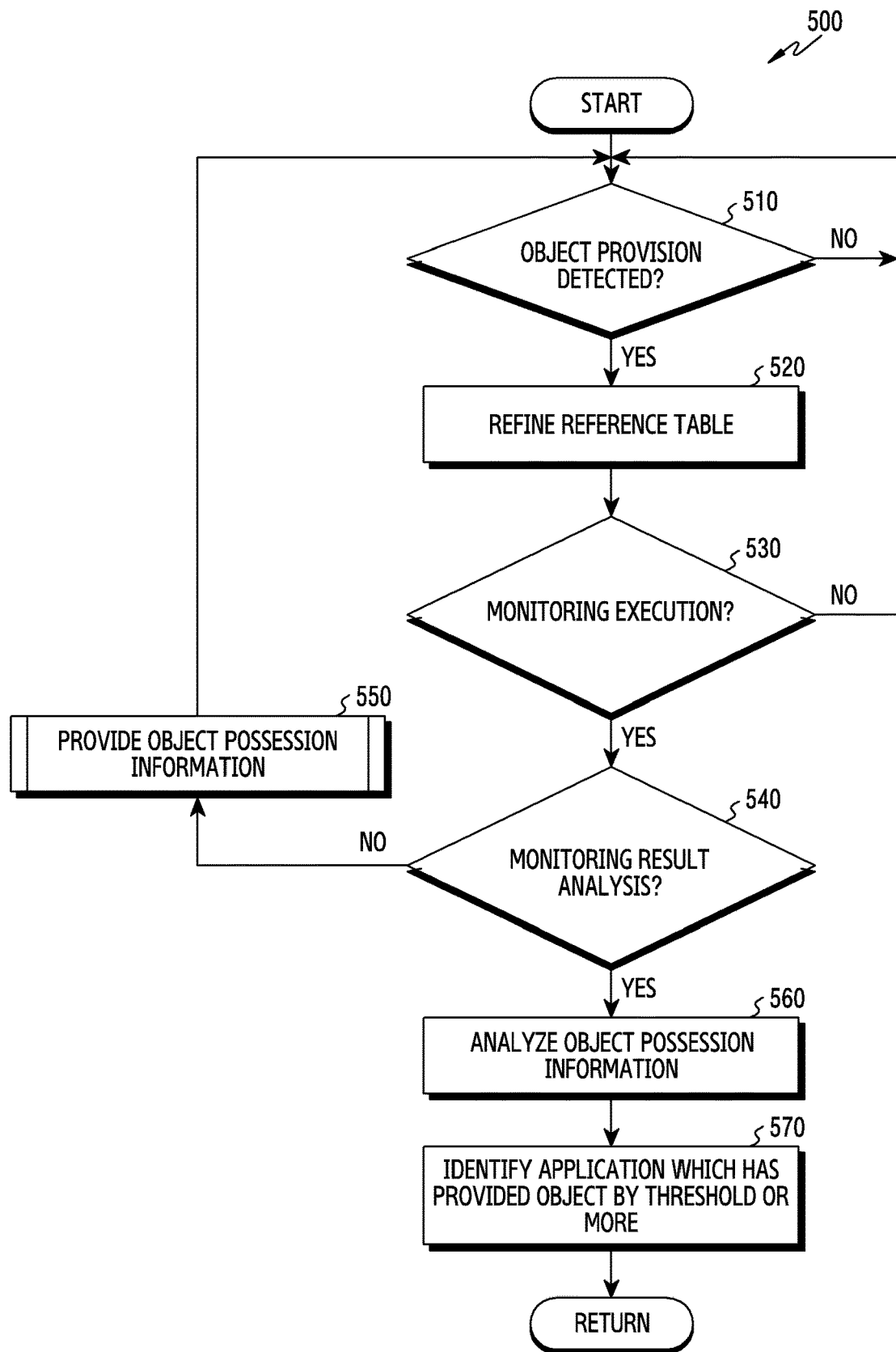
FIG. 5 is a flowchart for identifying an application which abnormally provides an object in an electronic device according to various embodiments.

FIG. 5 is a flowchart 500 for identifying an application which abnormally provides an object in an electronic device according to various embodiments. In the following description, FIG. 7 is a diagram for explaining an operation of providing object possession information according to various embodiments. Operations of FIG. 5 described below represent various embodiments of operation 410 to operation 430 of FIG. 4. In an embodiment below, respective operations can be performed in sequence as well, but are not necessarily performed in sequence. For example, the order of the respective operations can be changed as well, and at least two operations can be performed in parallel as well. The electronic device of FIG. 5 can be the electronic device 101 of FIG. 1.

Referring to FIG. 5, in operation 510, the electronic device (e.g., the virtual machine 320 of FIG. 3) of various embodiments can detect object provision or non-provision. The object provision can be related to invoking a native function in a Java application. For example, in response to the invoking of the native function being detected through the JNI 310, the virtual machine 320 can determine that object provision has been detected. Also, the virtual machine 320 can use the native library 230, to provide an object corresponding to a function invoked in the Java application 250 and provide the same to the Java application 250 through the JNI 310.

In operation 520, the electronic device (e.g., the virtual machine 320) of various embodiments can provide reference information on the provided object. The reference information can prevent the provided object from being eliminated by garbage collection. For instance, the reference information can include information on a target (e.g., a thread, another object, etc.) which the provided object refers to.

In operation 530, the electronic device (e.g., the virtual machine 320) of various embodiments can determine monitoring execution or non-execution for an application providing an object. The monitoring execution or non-execution can be determined by comparing the number of refined references and a first criterion value. The first criterion value is a value for determining the monitoring execution or non-execution for the application providing the object. For example, in response to the number of refined references exceeding the first criterion value, the virtual machine 320 can determine that a monitoring execution condition has been satisfied. This is merely illustrative, and an embodiment of the present disclosure is not limited to this. For example, the virtual machine 320 can determine the monitoring execution or non-execution on the basis of the number of objects stored in a heap region as well.

According to various embodiments, in response to determining the non-execution of a monitoring operation, the electronic device (e.g., the virtual machine 320) can repeatedly perform the operation of determining the monitoring execution or non-execution. For example, the operation of determining the execution or non-execution can include at least one of operation 510 to operation 530.

According to various embodiments, in response to determining the monitoring execution, in operation 540, the electronic device (e.g., the virtual machine 320) can determine the analysis or non-analysis of the monitoring result. The analysis or non-analysis of the monitoring result can be determined by comparing the number of refined references and a second criterion value. The second criterion can have a greater value than the first criterion value, and have a value less than the maximum storage number of reference information. For example, in response to the number of refined references exceeding the second criterion value, the virtual machine 320 can analyze the monitoring result. Through the analysis of the monitoring result, the virtual machine 320 can identify an application abnormally providing an object.

According to various embodiments, until analyzing the monitoring result after performing the monitoring operation, the electronic device (e.g., the virtual machine 320) can, in operation 550, provide object possession information. The object possession information can include information on an application having provided an object or a thread. For example, as illustrated in FIG. 7, at a time point at which the number of objects stored in the heap region exceeds the first criterion value, the possession information can begin to be provided (710). Also, in response to an object being accumulated in the heap region, the possession information corresponding to the accumulated object can be also accumulated. Further, this possession information can be accumulated and provided (720) until when the number of objects stored in the heap region exceeds the second criterion value.

According to various embodiments, in response to analyzing the monitoring result, in other words, in response to possession information of a previously specified number or more being accumulated, in operation 560, the electronic device (e.g., the virtual machine 320) can analyze the object possession information. For example, the virtual machine 320 can invoke a function for identifying at least one of application ID, application name, or application version information.

In operation 570, the electronic device (e.g., the virtual machine 320) of various embodiments can identify an application abnormally providing an object on the basis of the analysis result of the object possession information.

Figure 6:
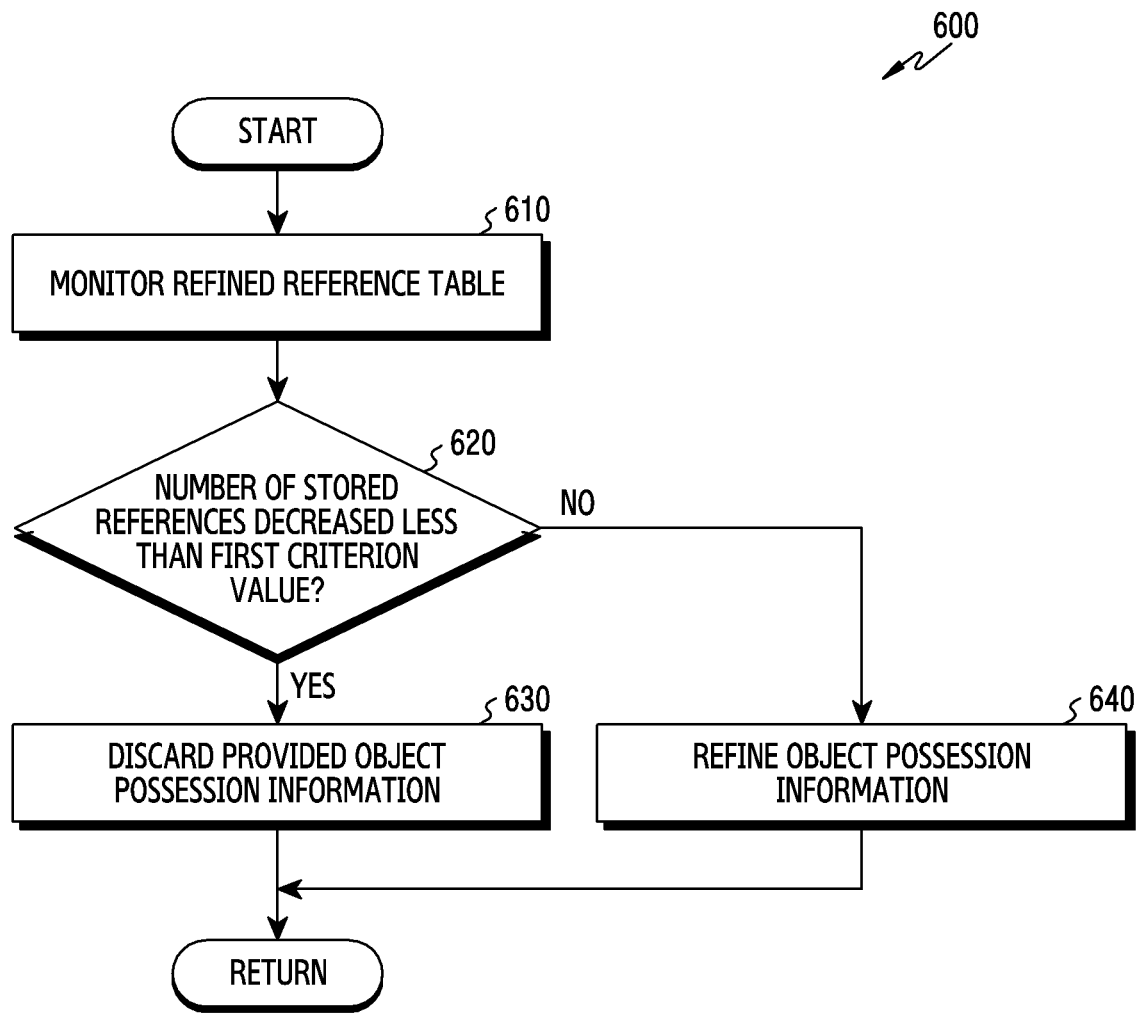
FIG. 6 is a flowchart for providing object possession information in an electronic device according to various embodiments.

FIG. 6 is a flowchart 600 for providing object possession information in an electronic device according to various embodiments. Operations of FIG. 6 described below represent various embodiments of operation 550 of FIG. 5. In an embodiment below, respective operations can be performed in sequence as well, but are not necessarily performed in sequence. For example, the order of the respective operations can be changed as well, and at least two operations can be performed in parallel as well. The electronic device of FIG. 6 can be the electronic device 101 of FIG. 1.

Referring to FIG. 6, in operation 610, the electronic device (e.g., the virtual machine 320 of FIG. 3) of various embodiments can perform monitoring for a refined reference table. The virtual machine 320 can monitor the number of references stored in the reference table. For example, a monitoring target can include global reference information. As described above, the monitoring execution or non-execution can be determined on the basis of the number of objects stored in the heap region as well. Accordingly, the virtual machine 320 can monitor the number of refined objects as well.

In operation 620, the electronic device (e.g., the virtual machine 320) of various embodiments can determine whether the number of references stored in the reference table is decreased less than a first criterion value. As described above, the first criterion value is a value for determining the execution or non-execution of a monitoring operation for an application providing an object, in other words, the provision or non-provision of possession information on the provided object.

According to various embodiments, in response to the number of stored references being decreased less than the first criterion value, the electronic device (e.g., the virtual machine 320) can, in operation 630, determine that the number of references has been decreased in such an extent that an overflow of the reference table is not provided and, correspondingly to this determination, the electronic device can stop the operation of providing the possession information. For example, the virtual machine 320 can discard the provided object possession information.

According to various embodiments, in response to the number of stored references not being decreased less than the first criterion value, the electronic device (e.g., the virtual machine 320) can, in operation 640, refine the object possession information. For example, the virtual machine 320 can determine that there is a possibility of providing an overflow of the reference table, and continuously provide the possession information on the provided object.

According to various embodiments, the first criterion value and the second criterion value related to the providing of possession information and a time point of completing the providing of the possession information can be fixed values. However, this is merely illustrative, and the present disclosure is not limited to this. For example, in response to the number of objects being repeatedly increased and decreased with a criterion of the first criterion value, the providing and discarding of the possession information can repeatedly occur and thus affect the performance of the virtual machine 320. Accordingly, the first criterion value and the second criterion value can be dynamically changed on the basis of a memory use capacity, the number of executed or installed applications, a storage history of an object, etc.

Figure 8:
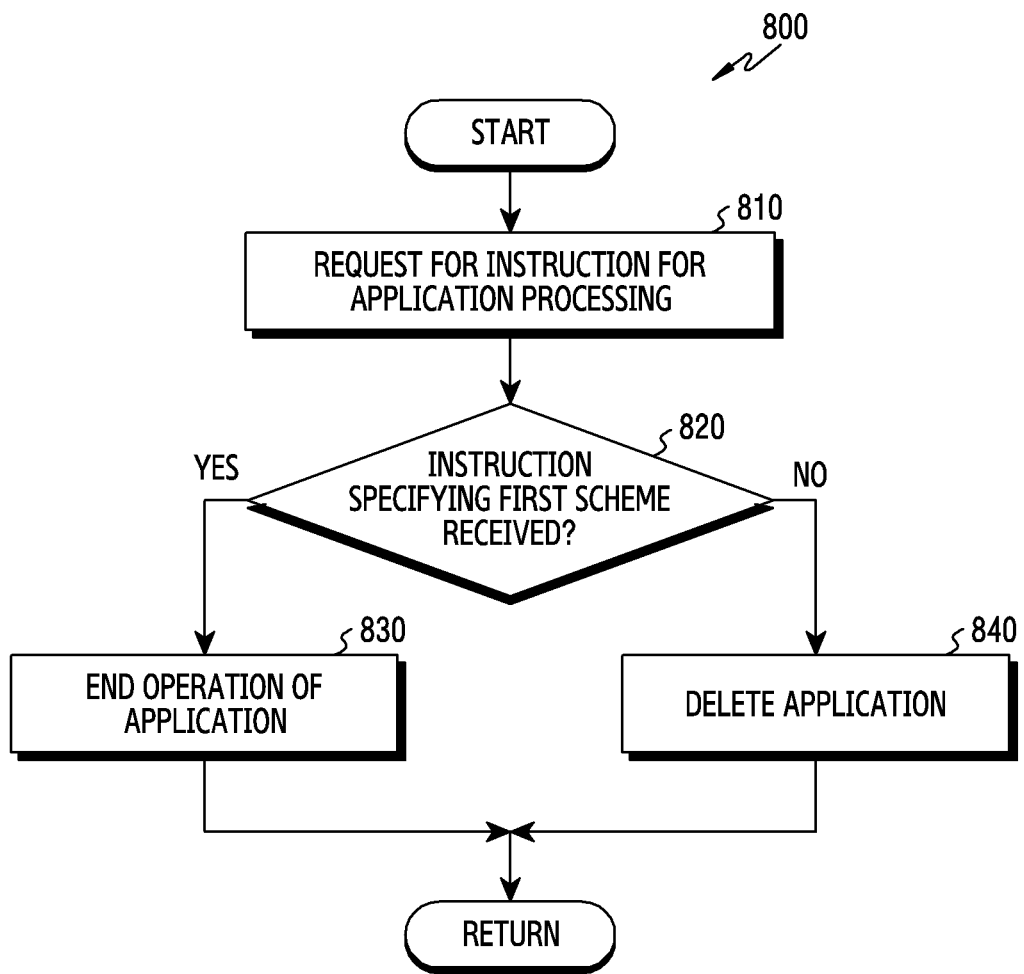
FIG. 8 is a flowchart for processing an application which provides an abnormal object in an electronic device according to various embodiments.
Figure 9:
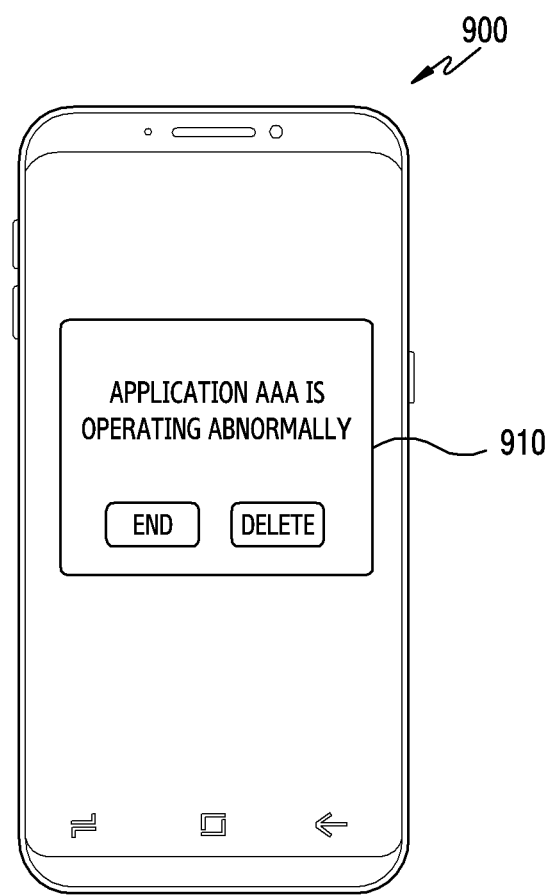
FIG. 9 is a diagram for explaining an operation of offering information on an application which abnormally operates according to various embodiments.

FIG. 8 is a flowchart 800 for processing an application which provides an abnormal object in an electronic device according to various embodiments. In the following description, FIG. 9 is a diagram 900 for explaining an operation of offering information on an application which abnormally operates according to various embodiments. Operations of FIG. 8 described below represent various embodiments of operation 440 of FIG. 4. In an embodiment below, respective operations can be performed in sequence as well, but are not necessarily performed in sequence. For example, the order of the respective operations can be changed as well, and at least two operations can be performed in parallel as well. The electronic device of FIG. 8 can be the electronic device 101 of FIG. 1.

Referring to FIG. 8, in operation 810, the electronic device (e.g., the processor 120 of FIG. 1) of various embodiments can request for an instruction for processing an application. The application can include an application having a possibility of providing an overflow of a reference table. For example, the application can include an application abnormally repeatedly providing an object. According to an embodiment, the processor 120 can receive information on an application from the virtual machine 320. For instance, the processor 120 can process to output the received information on the application through the display apparatus 160. For instance, the information on the application can be outputted in the form of pop-up. For example, as illustrated in FIG. 9, information 900 outputted through the display apparatus 160 can include information (e.g., a name, a version, an ID, etc.) on an application abnormally operating, and a menu (e.g., an end menu and/or a deletion menu) 910 specifying a scheme of processing the application, etc.

In operation 820, the electronic device (e.g., the processor 120 of FIG. 1) of various embodiments can determine whether it receives an instruction specifying a first scheme or an instruction specifying a second scheme. The first scheme can be a scheme of ending an operation of an application having a possibility of providing an overflow of a reference table. The second scheme can be a scheme of deleting the application having the possibility of providing the overflow of the reference table from the electronic device.

According to various embodiments, in response to receiving the instruction specifying the first scheme, in operation 830, the electronic device (e.g., the processor 120) can end the operation of the application.

According to various embodiments, in response to receiving the instruction specifying the second scheme, in operation 840, the electronic device (e.g., the processor 120) can delete the application from the electronic device.

Figure 10:
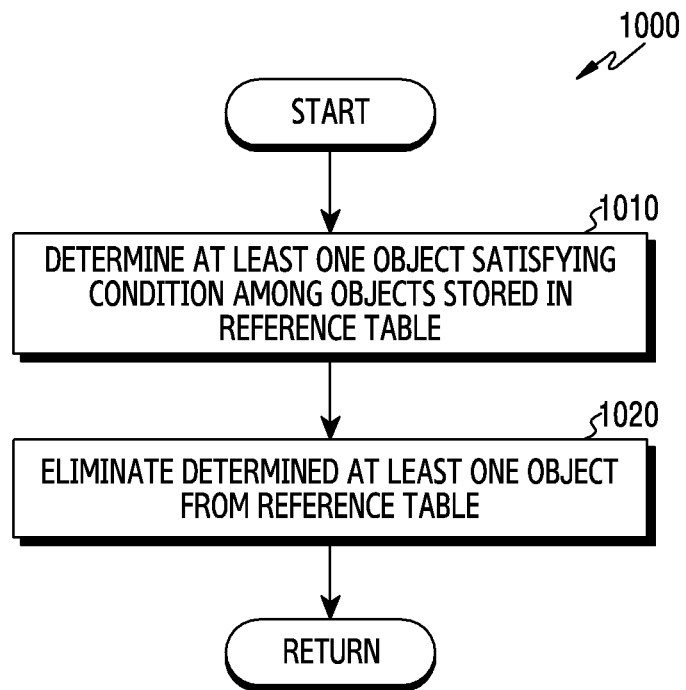
FIG. 10 is a flowchart for managing a reference table in an electronic device according to various embodiments.

FIG. 10 is a flowchart 1000 for managing a reference table in an electronic device according to various embodiments. Operations of FIG. 10 described below represent various embodiments of operation 440 of FIG. 4. In an embodiment below, respective operations can be performed in sequence as well, but are not necessarily performed in sequence. For example, the order of the respective operations can be changed as well, and at least two operations can be performed in parallel as well. The electronic device of FIG. 10 can be the electronic device 101 of FIG. 1.

Referring to FIG. 10, in operation 1010, the electronic device (e.g., the virtual machine 320 of FIG. 3) of various embodiments can determine at least one reference satisfying a condition among references stored in a reference table. The determined reference can be a target to be deleted from the reference table. According to an embodiment, the virtual machine 320 can specify a deletion target on the basis of a time of providing a reference. For example, at least one reference of which the providing time exceeds a threshold can be specified as the deletion target. This is merely illustrative, and an embodiment of the present disclosure is not limited to this. For example, unlike the aforementioned embodiment, the virtual machine 320 can maintain at least one reference of which the providing time exceeds a threshold and specify at least one reference of which the providing time does not exceed the threshold as the deletion target as well.

In operation 1020, the electronic device (e.g., the virtual machine 320) of various embodiments can delete the at least one reference determined as the deletion target, from the reference table. For example, the virtual machine 320 can identify an object corresponding to the reference determined as the deletion target, and return a function having provided the identified object, thereby performing a deletion operation.

As described above, FIG. 10 has explained an embodiment of deleting at least one reference satisfying a condition from a reference table in order to prevent an overflow of the reference table. According to various embodiments, the electronic device 101 can prevent the overflow of the reference table by deleting an object satisfying a condition among objects stored in a heap region in the same or similar scheme as the aforementioned scheme as well.

Figure 11:
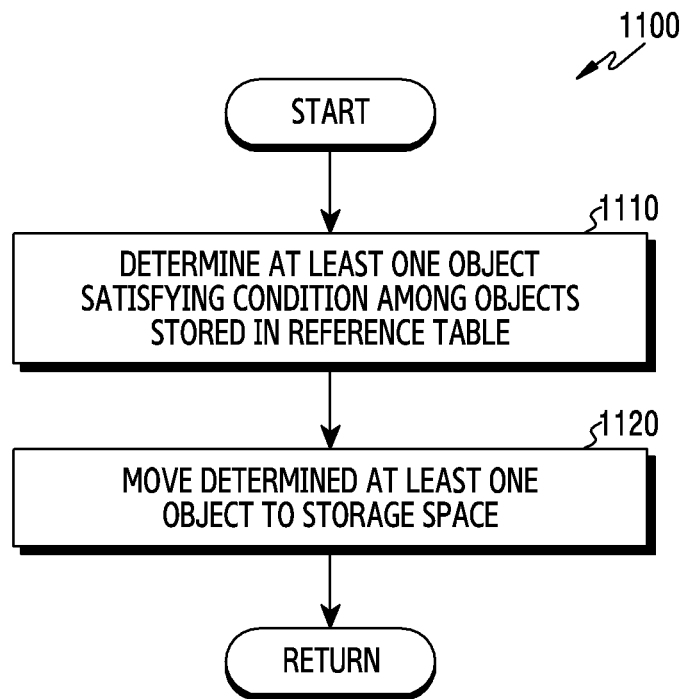
FIG. 11 is another flowchart for managing a reference table in an electronic device according to various embodiments.

FIG. 11 is a flowchart 1100 for managing a reference table in an electronic device according to various embodiments. Operations of FIG. 11 described below represent various embodiments of operation 440 of FIG. 4. In an embodiment below, respective operations can be performed in sequence as well, but are not necessarily performed in sequence. For example, the order of the respective operations can be changed as well, and at least two operations can be performed in parallel as well. The electronic device of FIG. 11 can be the electronic device 101 of FIG. 1.

Referring to FIG. 11, in operation 1110, the electronic device (e.g., the virtual machine 320 of FIG. 3) of various embodiments can determine at least one reference satisfying a condition among references stored in a reference table. The determined reference can be a target to be moved to another storage space. According to an embodiment, the virtual machine 320 can specify a movement target on the basis of a time of providing a reference. For example, at least one reference of which the providing time exceeds a threshold can be specified as the movement target. This is merely illustrative, and an embodiment of the present disclosure is not limited to this. For example, unlike the aforementioned embodiment, the virtual machine 320 can maintain at least one reference of which the providing time exceeds a threshold, and specify at least one reference of which the providing time does not exceed the threshold as the movement target as well.

In operation 1120, the electronic device (e.g., the virtual machine 320) of various embodiments can move the at least one reference determined as the movement target, to another storage space. For example, the virtual machine 320 can provide an additional heap region different from a heap region where the reference table has been stored, and move the at least one reference determined as the movement target, to the provided additional heap region.

An operating method of an electronic device (e.g., the electronic device 101) of various embodiments can include executing a Java application (e.g., the application 250) through a virtual machine (e.g., the virtual machine 320), and in response to provision of an object being detected during execution of the Java application, providing a reference for the provided object, and identifying an application, which has provided the object by a threshold or more, on the basis of the provided reference, and offering information on the identified application.

According to various embodiments, the provided reference can include a global reference.

According to various embodiments, identifying the application can include, in response to the number of the references exceeding a first threshold, monitoring an object which is provided by a designated count, and identifying at least one application related to the provided object. According to an embodiment, monitoring the object can be performed until before the number of the references exceeds a second threshold.

According to various embodiments, monitoring the object can include storing application information related to the provided object. According to an embodiment, the application information can include at least one of application ID, application name, or application version information.

According to various embodiments, offering the information on the identified application can include identifying at least one reference satisfying a condition among the provided references, and deleting the identified at least one reference.

According to various embodiments, offering the information on the identified application can include providing an additional region different from a region where the provided reference has been stored, and moving the identified at least one reference to the additional region.

According to various embodiments, offering the information on the identified application can include ending the execution of the identified application.

According to various embodiments, offering the information on the identified application can include deleting the identified application.

According to various embodiments, offering the information on the identified application can include offering the identified application to another electronic device.

Meantime, a description has been made for various embodiments of the present disclosure, but various modifications can be made within a limit not departing from the scope of the various embodiments of the present disclosure. Therefore, the scope of the various embodiments of the present disclosure should not be limited to and defined by the described embodiment and should be defined by not only claims described later but also the equivalents to these claims.

The invention claimed is:

1. An electronic device comprising:
a processor; and
a memory electrically connected to the processor,
wherein the memory is configured to store multiple Java application programs, and stores instructions that, when executed, cause the processor to execute a virtual machine configured to execute at least one Java application stored in the memory, and
in response to provision of an object being detected during execution of the Java application, the virtual machine executed by the processor provides a reference for the provided object, identifies an application, which has provided the object by a threshold or more, on the basis of the provided reference, and offers information on the identified application to the processor.

2. The electronic device of claim 1, wherein the virtual machine monitors the number of global references.

3. The electronic device of claim 1, wherein, in response to the number of the references exceeding a first threshold, the virtual machine monitors an object which is provided by a designated count, and identifies at least one application related to the provided object.

4. The electronic device of claim 3, wherein the virtual machine monitors an object which is provided until before the number of the references exceeds a second threshold.

5. The electronic device of claim 3, wherein the virtual machine stores application information related to the provided object, and
the application information comprises at least one of application ID, application name, or application version information.

6. The electronic device of claim 1, wherein the virtual machine identifies at least one reference satisfying a condition among the provided references, and deletes the identified at least one reference.

7. The electronic device of claim 1, wherein the virtual machine provides an additional region different from a region where the provided reference has been stored, and moves the identified at least one reference to the additional region.

8. The electronic device of claim 1, wherein the instruction processes the identified application, and the processing of the application comprises at least one of the end of the execution of the identified application, the deletion of the identified application or the transmitting of the identified application to another electronic device.

9. An operating method of an electronic device, comprising:

executing a Java application through a virtual machine;

in response to provision of an object being detected during execution of the Java application, providing a reference for the provided object;

identifying an application, which has provided the object by a threshold or more, on the basis of the provided reference; and offering information on the identified application.

10. The method of claim 9, wherein identifying the application comprises:

in response to the number of the references exceeding a first threshold, monitoring an object which is provided by a designated count; and identifying at least one application related to the provided object.

11. The method of claim 10, wherein monitoring the object is performed until before the number of the references exceeds a second threshold.

12. The method of claim 11, wherein monitoring the object comprises storing application information related to the provided object, and the application information comprises at least one of application ID, application name, or application version information.

13. The method of claim 9, wherein offering the information on the identified application comprises:

identifying at least one reference satisfying a condition among the provided references; and deleting the identified at least one reference.

14. The method of claim 9, wherein offering the information on the identified application comprises:

providing an additional region different from a region where the provided reference has been stored; and moving the identified at least one reference to the additional region.

15. The method of claim 9, further comprising processing the identified application, wherein the processing of the application comprises at least one of the end of the execution of the identified application, the deletion of the identified application or the transmitting of the identified application to another electronic device.

* * * * *